United States Patent [19]
Shiba et al.

[11] Patent Number: 5,511,222
[45] Date of Patent: Apr. 23, 1996

[54] PRIORITY ENCODER

[75] Inventors: Masue Shiba, Tokyo; Shigeharu Nakata, Fujisawa, both of Japan

[73] Assignee: Kabushiki Kaisha Toshiba, Kawasaki, Japan

[21] Appl. No.: 375,009

[22] Filed: Jan. 18, 1995

Related U.S. Application Data

[63] Continuation of Ser. No. 188,114, Jan. 28, 1994, abandoned, which is a continuation of Ser. No. 647,936, Jan. 30, 1991, abandoned.

[30] Foreign Application Priority Data

Jan. 31, 1990 [JP] Japan ..................... 2-18918

[51] Int. Cl.$^6$ .................................. G06F 15/00
[52] U.S. Cl. ........................... 395/800; 341/160
[58] Field of Search ....................... 395/800, 725; 341/160

[56] References Cited

U.S. PATENT DOCUMENTS

| | | | |
|---|---|---|---|
| 4,348,741 | 9/1982 | McAlister et al. | 364/DIG. 2 |
| 4,887,084 | 12/1989 | Yamaguchi | 341/160 |
| 4,924,421 | 5/1990 | Seguchi | 364/715.1 |

FOREIGN PATENT DOCUMENTS

| | | |
|---|---|---|
| 2173617 | 10/1986 | United Kingdom . |
| WO89/02119 | 3/1989 | WIPO . |

OTHER PUBLICATIONS

Noriyoshi Kuroyangi, "High Speed Arithmetic System for Multiplication and Floating Point System Calculation", Review Of The Electrical Communication Laboratory, vol. 10, No. 3–4, Mar.–Apr. 1962, pp. 207–229.

*Primary Examiner*—Alyssa H. Bowler
*Assistant Examiner*—John Harrity
*Attorney, Agent, or Firm*—Finnegan, Henderson, Farabow, Garrett & Dunner

[57] ABSTRACT

A priority encoder-includes an encoder for coding an input consisting of a plurality of bits, selectors, respectively provided for bit input terminals of the encoder, for respectively receiving corresponding ones of a plurality of bits of an operand input, each of the selectors including a switch circuit to be controlled by an operand input bit, a carry line connected in series with the switch circuit and connected in series with all of the selectors, a first precharge circuit, connected to a carry line portion on one end side of the switch circuit, for precharging the carry line at a predetermined timing, a first detector which is controlled by an enable signal for designating upper bit priority and detects whether a potential of a carry line portion on an upper bit side of the switch circuit is at a discharge level, a second detector which is controlled by an enable signal for designating lower bit priority and detects whether a carry line portion on a lower bit side of the switch circuit is at a discharge level, and a third detector for detecting whether one of outputs from the first and second detectors and the operand input bit are both in an active state.

10 Claims, 8 Drawing Sheets

| $E_I$ | CODE INPUT | | | | | | | | OUTPUT | | | | |
|---|---|---|---|---|---|---|---|---|---|---|---|---|---|
| | D7 | D6 | D5 | D4 | D3 | D2 | D1 | D0 | GS | $Q_C$ | $Q_B$ | $Q_A$ | $E_O$ |
| 0 | * | * | * | * | * | * | * | * | 0 | 0 | 0 | 0 | 0 |
| 1 | 0 | 0 | 0 | 0 | 0 | 0 | 0 | 0 | 0 | 0 | 0 | 0 | 1 |
| 1 | 0 | 0 | 0 | 0 | 0 | 0 | 0 | 1 | 1 | 0 | 0 | 0 | 0 |
| 1 | 0 | 0 | 0 | 0 | 0 | 0 | 1 | * | 1 | 0 | 0 | 1 | 0 |
| 1 | 0 | 0 | 0 | 0 | 0 | 1 | * | * | 1 | 0 | 1 | 0 | 0 |
| 1 | 0 | 0 | 0 | 0 | 1 | * | * | * | 1 | 0 | 1 | 1 | 0 |
| 1 | 0 | 0 | 0 | 1 | * | * | * | * | 1 | 1 | 0 | 0 | 0 |
| 1 | 0 | 0 | 1 | * | * | * | * | * | 1 | 1 | 0 | 1 | 0 |
| 1 | 0 | 1 | * | * | * | * | * | * | 1 | 1 | 1 | 0 | 0 |
| 1 | 1 | * | * | * | * | * | * | * | 1 | 1 | 1 | 1 | 0 |

(*:don't care)

(PRIOR ART)

FIG. 1

(PRIOR ART)

(PRIOR ART)

PRIORITY ENCODER

This application is a continuation of application Ser. No. 08/188,114 filed Jan. 28, 1994, now abandonded, which is a continuation of application Ser. No. 07/647,936, filed Jan. 30, 1991, now abandonded.

BACKGROUND OF THE INVENTION

1. Field of the Invention

The present invention relates to an improvement in a priority encoder formed in a semiconductor integrated circuit and, more particularly, to a priority encoder used for a device, in a microprocessor, such as a multiplier or a frame switching system for image processing.

2. Description of the Related Art

In a microprocessor or a peripheral interface apparatus having a timer function, a serial interface function, a parallel interface function, and the like, instructions and data are often coded to be used. A priority encoder having a bit priority function with respect to an input signal is widely used for a multiplier, a frame switching system for image processing, or the like in a microprocessor.

Figure 1:
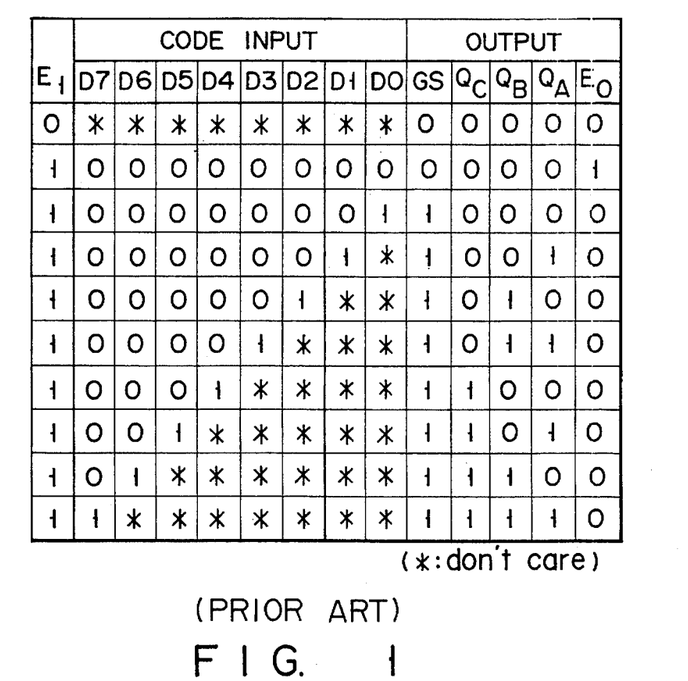
FIG. 1 is a view showing a truth table indicating an operation function of an upper bit priority type 8-bit encoder.
Figure 2:
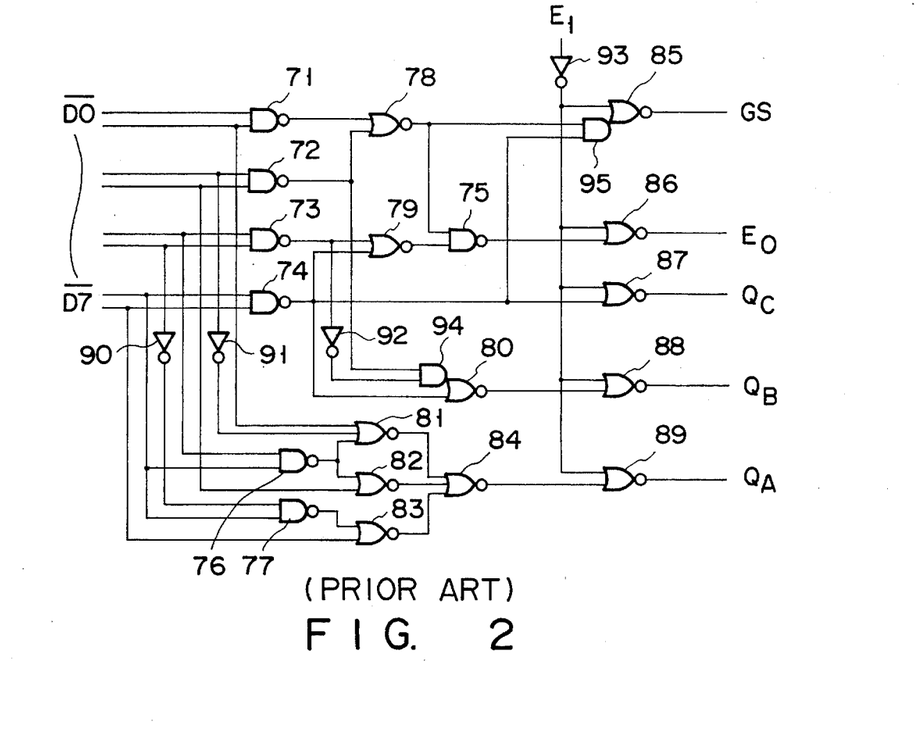
FIG. 2 is a circuit diagram showing a conventional upper bit priority type 8-bit encoder.

N-bit data can be easily coded by logical OR operations. More specifically, an operation function, of an upper bit priority type 8-bit encoder, indicated by a truth table shown in FIG. 1, can be realized by a static logic circuit shown in FIG. 2. FIG. 1 shows a relationship between 8-bit code inputs $D_7$ (most significant bit: MSB) to $D_0$ (least significant bit: MSB), an enable control input Ei, and output signals GS, $E_O$, QA, QB, and QC. A symbol * indicates a Low Level or high level (don't care). Referring to FIG. 2, reference numerals 71 to 77 denote NAND gates; 78 to 89, NOR gates; 90 to 93, inverters; and 94 and 95, AND gates.

In the static circuit arrangement shown in FIG. 2, however, a large number of logic circuits are required to check the state of each signal and to detect and code an active MSB signal. In addition, as the number of bits of an input signal is increased from 8 bits to 10 bits, 16 bits, and 32 bits, hardware for detecting an active MSB signal becomes considerably complicated. Furthermore, the number of elements is increased to several times to several tens times what it was, and the proportion of an area occupied by the encoder to the total area on an IC chip is increased.

Figure 3:
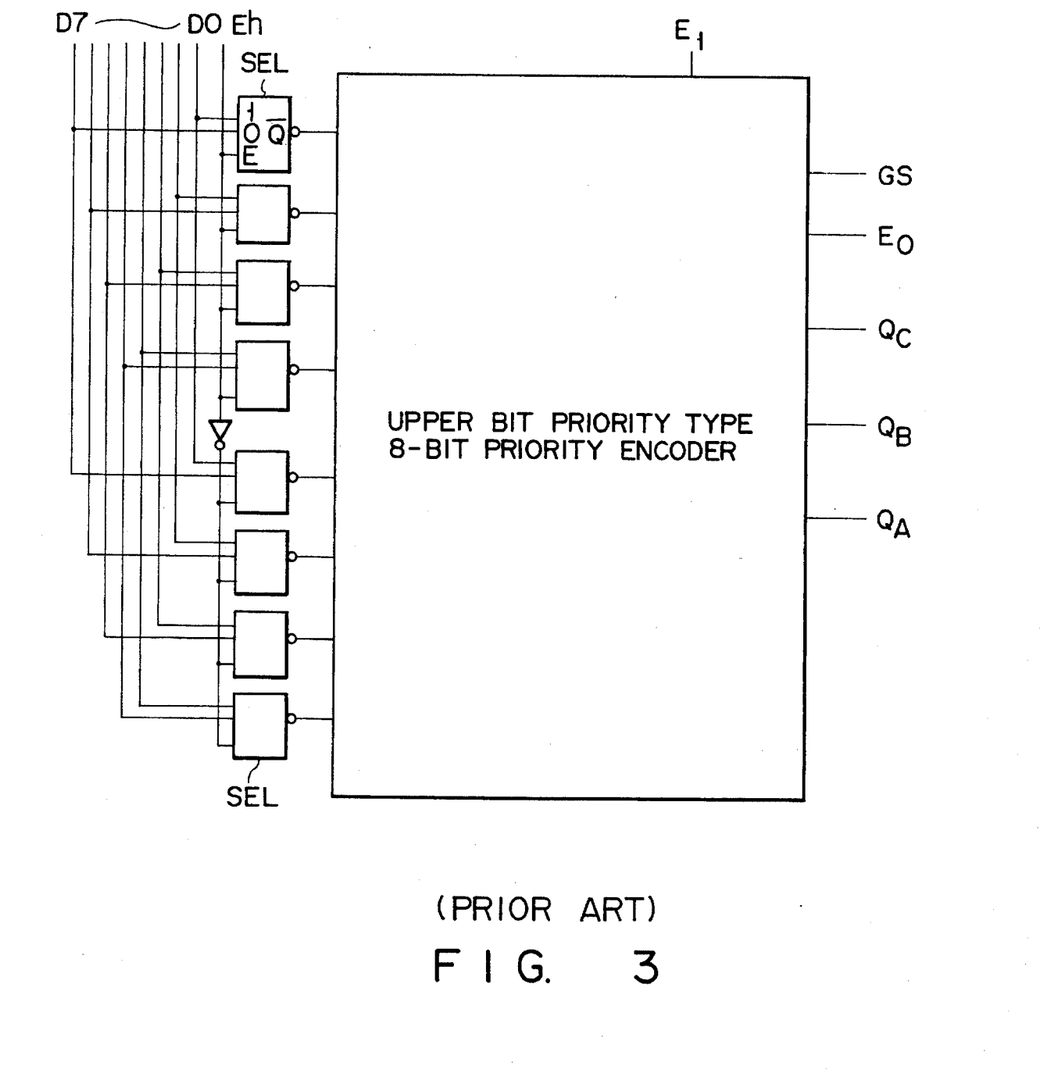
FIG. 3 is a block diagram showing a conventional 8-bit encoder capable of switching upper bit priority and lower bit priority schemes.

Moreover, in the conventional priority encoder, a priority direction is fixed. For this reason, in order to realize a lower bit priority type encoder, the input terminals of an upper bit priority type encoder must be reversed. That is, the above-described upper bit priority type 8-bit encoder must be switched to be also used as a lower bit priority type encoder. As shown in FIG. 3, therefore, such an arrangement requires 2-bit input terminals for respectively receiving bit pairs of an input signal: 0th bit and 7th bit, 1st bit and 6th bit, 2nd bit and 5th bit, and 3rd bit and 4th bit, and selectors SEL, corresponding to 8 bits, for selecting the respective 2-bit input terminals in accordance with a select signal Eh.

Figure 4:
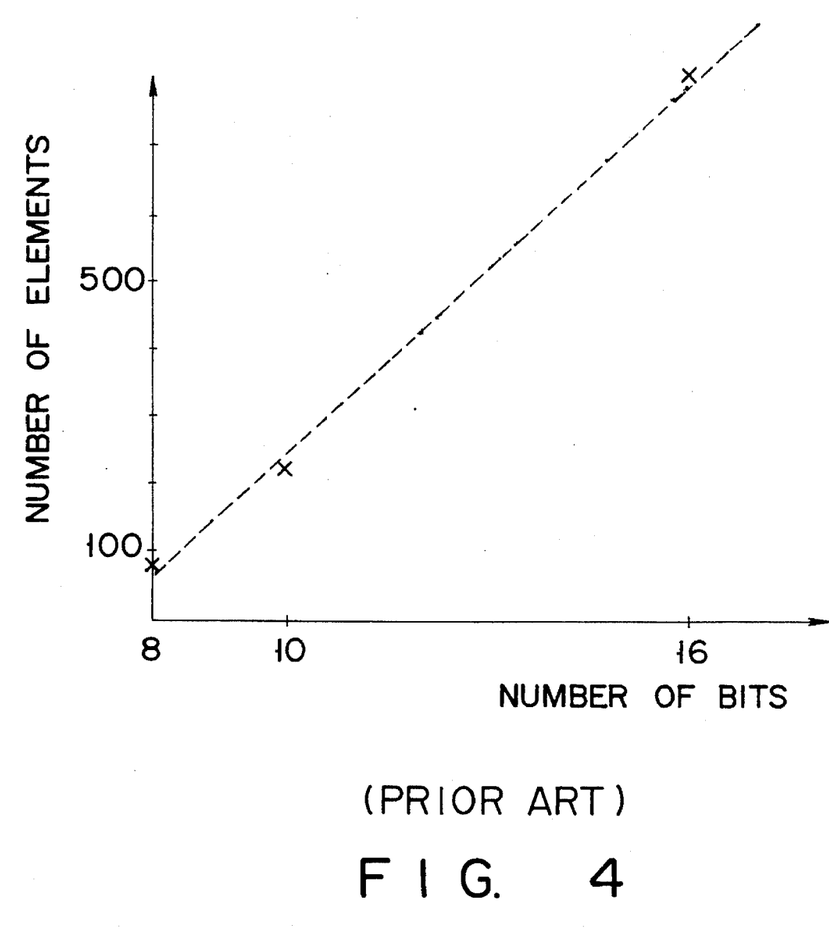
FIG. 4 is a graph showing a relationship between the number of bits and the number of elements to be used in systems constituted by conventional static logic circuits.

If a system is constituted by such static logic circuits as described above, the number of elements of a 10-bit priority encoder is increased to about twice that of an 8-bit priority encoder, as shown in FIG. 4. That is, the 10-bit priority encoder requires a chip area about twice that of the 8-bit priority encoder. The number of elements of a 16-bit priority encoder is increased to about four times that of the 10-bit priority encoder. That is, the 16-bit priority encoder requires a chip area about four times that of the 10-bit priority encoder. Therefore, in a high-level microcomputer having a large number of bits to be processed, the packing density is decreased, resulting in a decrease in operating speed. In other words, conventional hardware cannot satisfy the demands for higher performance and packing density.

SUMMARY OF THE INVENTION

The present invention has been made to solve the above-described problem, and has as its object to simplify the arrangement of a logic circuit, suppress an increase in number of elements even if the number of bits of an input signal is increased, suppress an increase in occupied area on an IC chip, and achieve a high packing density and a high operating speed.

According to the present invention, there is provided a priority encoder comprising an encoder stage for coding an input consisting of a plurality of bits, selectors, respectively provided for bit input terminals of the encoder stage, for respectively receiving corresponding ones of a plurality of bits of an operand input, each of the selectors including a switch circuit to be controlled by an operand input bit, a carry line connected in series with the switch circuit and connected in series with all of the selectors, a first precharge circuit, connected to a carry line portion on one end side of the switch circuit, for precharging the carry line at a predetermined timing, a first detector which is controlled by an enable signal for designating upper bit priority and detects whether a potential of a carry line portion on an upper bit side of the switch circuit is at a discharge level, a second detector which is controlled by an enable signal for designating lower bit priority and detects whether a carry line portion on a lower bit side of the switch circuit is at a discharge level, and a third detector for detecting whether one of outputs from the first and second detectors and the operand input bit are both in an active state, a second precharge circuit, connected to a portion, of one end portion of the carry line, on an uppermost selector side or a lowermost selector side, to which the first precharge circuit is not connected, for precharging the carry line at a predetermined timing, and two discharge circuits, respectively connected to two ends of the carry line, for selectively discharging the carry line in accordance with an upper bit priority designation mode/lower bit priority designation mode, wherein a potential, of a carry line portion on the upper bit side, input to the first detector of the selector for an MSB, and a potential, of a carry input portion on the lower bit side, input to the second detector of the selector for an LSB are both fixed at the discharge level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

Figure 5:
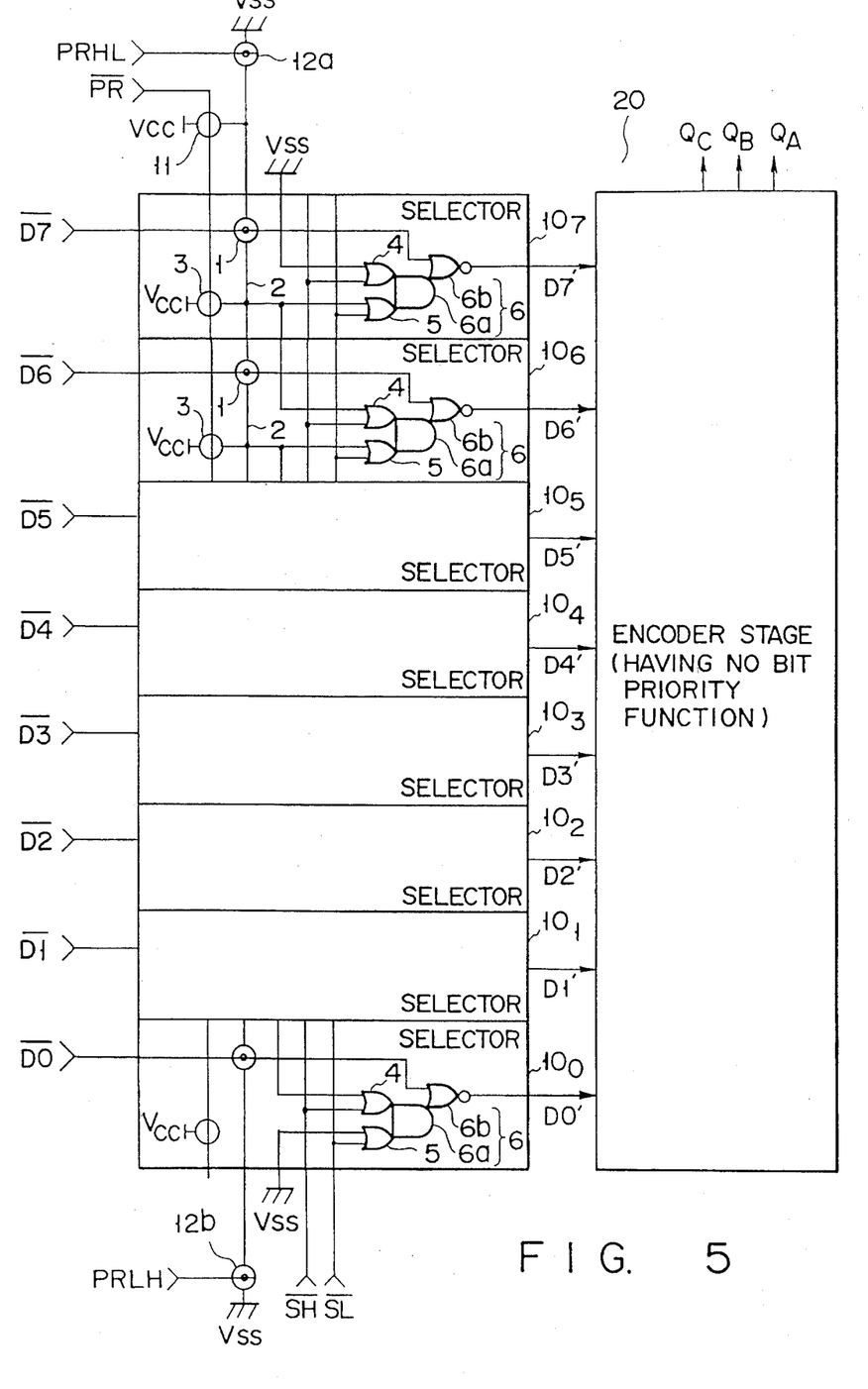
FIG. 5 is a block diagram for explaining an arrangement of a priority encoder according to an embodiment of the present invention.

FIG. 5 shows an 8-bit priority encoder formed on a semiconductor IC. Referring to FIG. 5, reference numerals $10_7$ to $10_0$ denote selectors for respectively receiving bits $\overline{D_7}$ to $\overline{D_0}$ of an 8-bit operand input; and 20, an encoder stage, having no bit priority function, for coding a plurality of bits supplied from the selectors $10_7$ to $10_0$. Reference symbols QC, QB, and QA denote 3-bit coded output signals.

Each of the selectors $10_7$ to $10_0$ is constituted by a switch circuit 1, a carry line 2, a first precharge circuit 3, a first detector 4, a second detector 5, and a third detector 6. The switch circuit 1 is controlled by an operand input bit $\overline{Di}$ (i=7 to 0). The carry line 2 is connected in series with the switch circuit 1 and is also connected in series with all the selectors $10_7$ to $10_0$. The first precharge circuit 3 is connected to a carry line portion connected to one terminal (the lower bit side terminal in this embodiment) of the switch circuit 1. The first precharge circuit 3 precharges the carry line to a power supply potential $V_{CC}$ at a predetermined timing. The first detector 4 is controlled by an enable signal $\overline{SH}$ for designating upper bit priority. The first detector 4 detects whether the potential of a carry line portion on the upper bit side of the switch circuit 1 is at a discharge level. In this case, the first detector 4 is constituted by a first OR gate 4 for calculating a logical OR between the enable signal $\overline{SH}$ for designating upper bit priority and the potential of the carry line portion on the upper bit side of the switch circuit 1. The second detector 5 is controlled by an enable signal $\overline{SL}$ for designating lower bit priority. The second detector 5 detects whether the potential of a carry line portion on the lower bit side of the switch circuit 1 is at a discharge level. In this case, the second detector 5 is constituted by a second OR gate 5 for calculating a logical OR between the enable signal $\overline{SL}$ for designating lower bit priority and the potential of the carry line portion on the lower bit side of the switch circuit 1. The third detector 6 detects whether one of outputs from the first and second detectors 4 and 5 and the operand input bit $\overline{Di}$ (i=7 to 0) are both active. The third detector 6 consists of an AND gate 6a and a NOR gate 6b. The AND gate 6a calculates a logical AND between outputs from the first and second OR gates 4 and 5. The NOR gate 6b calculates a logical NOR between an output from the AND gate 6a and the operand input bit $\overline{Di}$ (i=7 to 0), and supplies an output Di' (i'=7 to 0) to a corresponding bit of the encoder stage 20. Note that the potentials of the carry line portions on the upper and lower bit sides are fixed at the discharge level (ground potential $V_{SS}$). The enable signals SH and SL for respectively designating upper bit priority and lower bit priority are selectively activated ("L" level in this case) in accordance with an upper bit priority designation mode/lower bit priority designation mode.

In addition, a second precharge circuit 11 for precharging the carry line to the power supply voltage $V_{CC}$ at a predetermined timing is connected to a portion, of one end portion of the carry line 2, on the uppermost or lowermost selector side, to which the first precharge circuit 3 is not connected (on the uppermost selector side in this embodiment). Discharge circuits 12a and 12b are connected to the two ends of the carry line 2. The discharge circuits 12a and 12b selectively discharge the carry line 2 to the ground potential $V_{SS}$ in accordance with the upper bit priority designation mode/lower bit priority designation mode.

Figure 6:
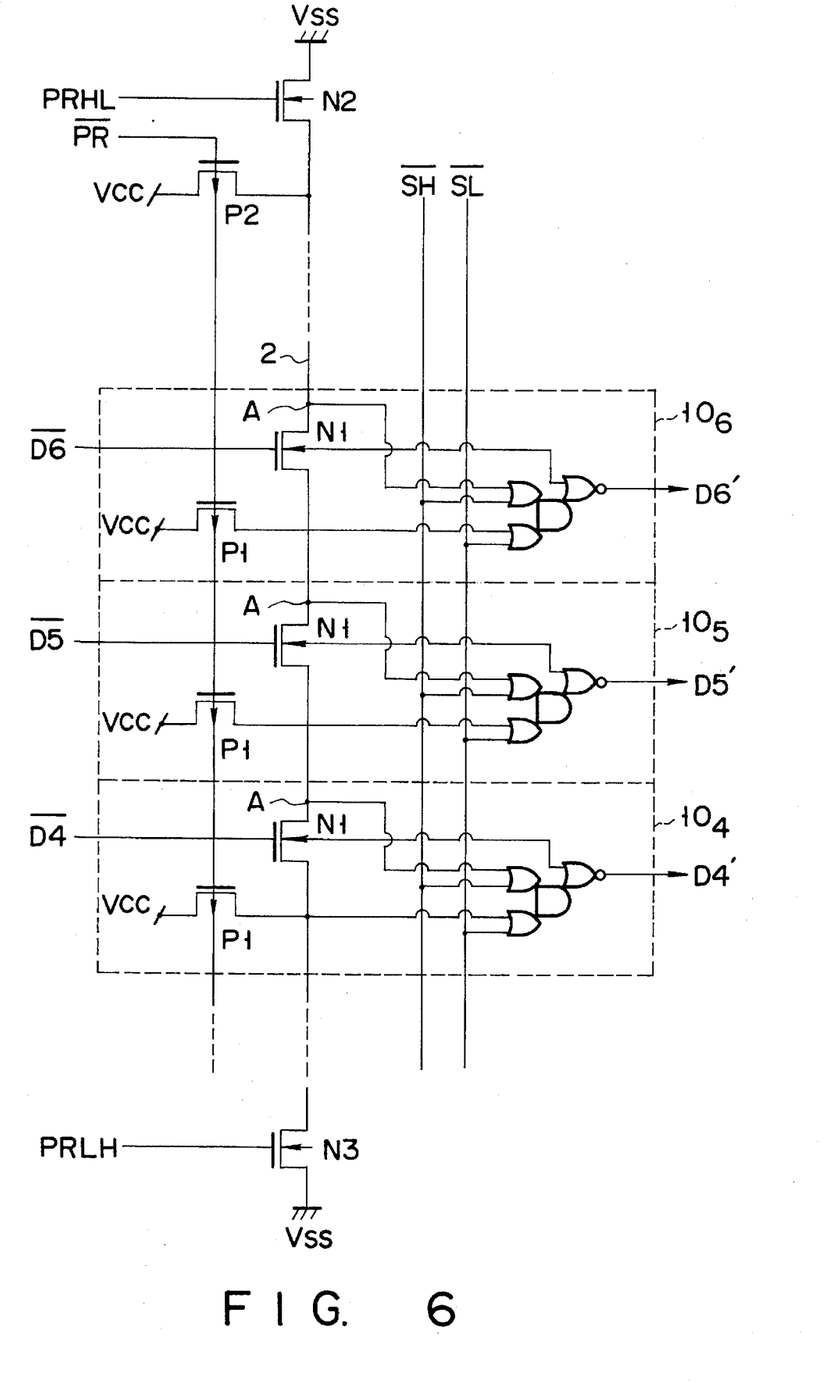
FIG. 6 is a circuit diagram showing selectors $10_6$ to $10_4$ corresponding to 3 bits, which are extracted as examples from the encoder in FIG. 5.

FIG. 6 shows the selectors $10_6$ to $10_4$ corresponding to 3 bits, extracted from the encoder in FIG. 5 as examples, together with the second precharge circuit 11 and the discharge circuits 12a and 12b.

In this case, the first and second precharge circuits 3 and 11 are constituted by p-channel MOS transistors P1 and P2, as practical examples, connected between the power supply potential $V_{CC}$ and the carry line 2. A precharge signal PR (to be set at "L" level in an active state) is supplied to the gates of the MOS transistors P1 and P2.

As a practical example of the switch circuit 1, FIG. 6 shows an n-channel MOS transistor N1 having a gate for receiving an operand input bit and connected in series with the carry line 2. An operand input bit is supplied to the gate of the MOS transistor N1. Each terminal B is a node within a particular selector, the B terminal being a node between the switch circuit transistor N1 and the precharge circuit transistor P1 and being along the carry line 2 and in common with the portion of the carry line extending into the next selector for the next less significant bit and common to the terminal A in that next selector.

FIG. 6 also shows n-channel MOS transistors N2 and N3 as practical examples of the discharge circuits 12a and 12b, which are connected between the carry line 2 and the ground potential $V_{SS}$. A first discharge signal PRHL, which is activated ("H" level) in the upper bit priority designation mode, is supplied to the gate of the transistor N2. A second discharge signal PRLH, which is activated ("H" level) in the lower bit priority designation mode, is supplied to the gate of the transistor N3.

Figure 7:
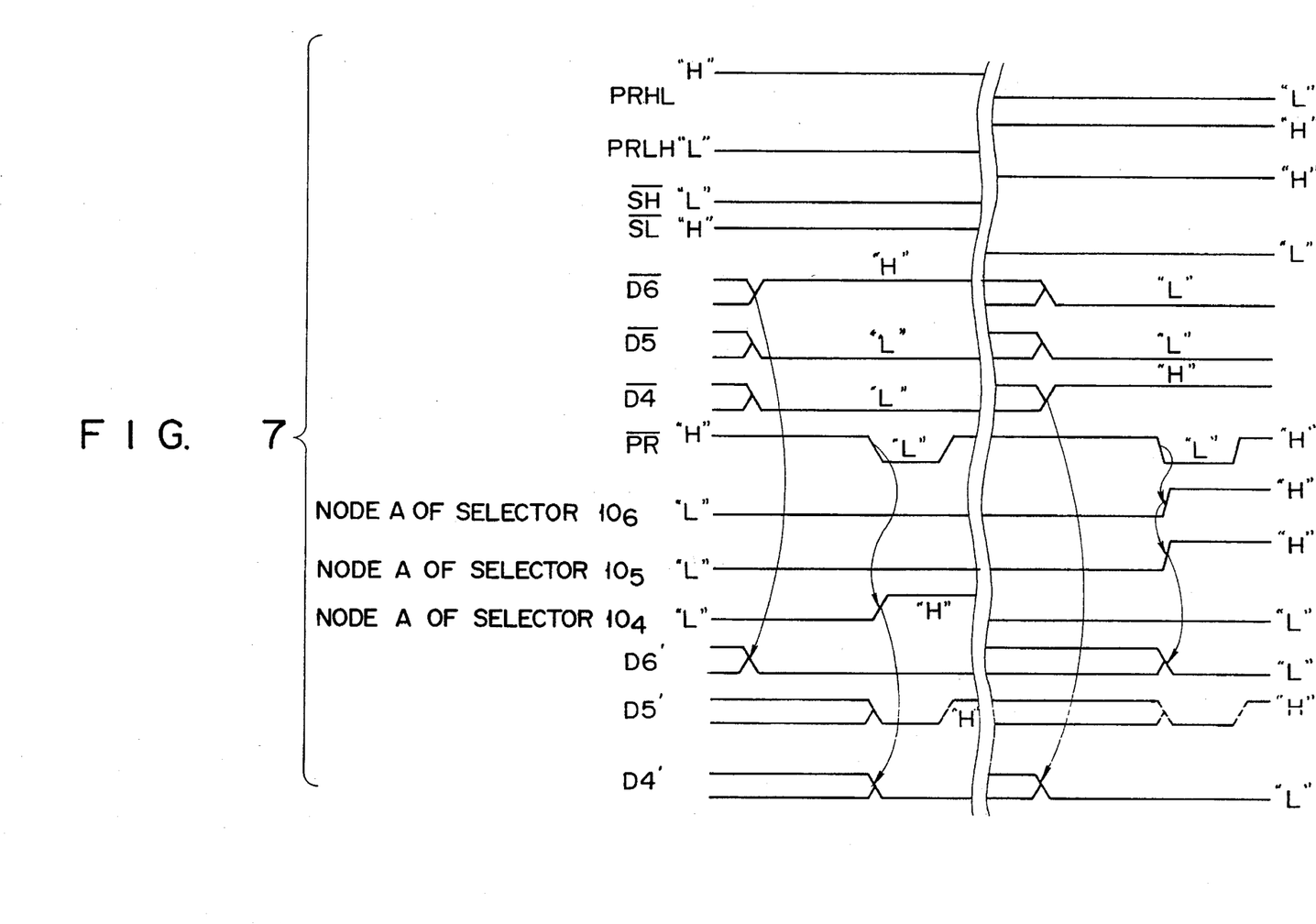
FIG. 7 is a timing chart showing an operation of the encoder in FIG. 5.

An operation of the priority encoder will be described below with reference to FIG. 7.

In the upper bit priority designation mode, the first discharge signal PRHL is in an active state ("H" level), the n-channel MOS transistor N2 for a discharge operation is ON, the second discharge signal PRLH is in an inactive state ("L" level), and the n-channel MOS transistor N3 for a discharge operation is OFF. The enable signal $\overline{SH}$ for designating upper bit priority is in an active state ("L" level), and the enable signal $\overline{SL}$ for designating lower bit priority is in an inactive state ("H" level). Assume that two operand input bits $\overline{D_5}$ and $\overline{D_4}$ are simultaneously activated ("L" level) at this time. In this case, the n-channel MOS transistor N1, as a switch, of the selector $10_5$ is turned off by the operand input bit $D_5$ closer to the MSB than the operand input bit $\overline{D_4}$. As a result, upper and lower bit side portions of the carry line 2 are electrically disconnected from each other. Subsequently, the precharge signal $\overline{PR}$ is kept in an active state ("L level") for a short period of time. In addition, the p-channel MOS transistors P1 and P2 for precharge operations are turned on. At this time, the upper bit side portion of the carry line 2 is kept in a discharge state because the driving power of the n-channel MOS transistor N2 for a discharge operation is set to be larger than that of the p-channel MOS transistor P2 for a precharge operation. The lower bit side portion of the carry line 2 is precharged to the potential $V_{CC}$ by the p-channel MOS transistor P1 for a precharge operation.

In the selector $10_5$, therefore, two inputs to the first OR gate 4 are set at "L" level. An output from the first OR gate 4 is set at "L" level. Since the enable signal $\overline{SL}$ for designating lower bit priority is input to the second OR gate 5, its output is set at "H" level. An output from the AND gate 6a of the selector $10_5$ is set at "L" level. An output $D_5$ from the NOR gate 6b is set at "H" level in accordance with the logical NOR between the "L"-level output from the AND gate 6a and the "L"-level operand input bit $\overline{D_5}$.

In contrast to this, in the selectors $10_4$ to $10_0$ on the lower bit side of the selector $10_5$, an output from the first OR gate 4 is set at "H" level in response to an "H"-level input from the carry line 2, an output from the second OR gate 5 is set at "H" level in response to the "H"-level enable signal $\overline{SL}$ for designating lower bit priority, an output from the AND gate 6a is set at "H" level, and an output from the NOR gate 6b is set at "L" level. In the selectors $10_7$ and $10_6$ on the upper bit side of the selector $10_5$, an output from the NOR gate 6b is set at "L" level in response to an "H"-level operand input bit.

In other words, according to the above-described operation, the active operand input bits are searched from the MSB. The output from the selector $10_5$, to which the operand input bit $\overline{D_5}$ searched out first is input, is set at "H" level so as to indicate that the MSB of the active operand input bits is the bit $\overline{D_5}$. Even if a bit lower than the operand input bit $\overline{D_5}$ is in an active state ("L" level), since it is not the MSB of the active operand input bits, it is regarded as an inactive bit ("H" level). Such an operation is equivalent to that a portion indicated by the symbol, (don't care) in the truth table in FIG. 1 is fixed at "1" level.

In contrast to the above description, in the lower bit priority designation mode, the second discharge signal PRLH is in an active state ("H" level), the n-channel MOS transistor N3 for a discharge operation is ON, the first discharge signal PRHL is in an inactive state ("L" level), and the n-channel MOS transistor N2 for a discharge operation is OFF. The enable signal $\overline{SL}$ for designating lower bit priority is in an active state ("L" level), and the enable signal $\overline{SH}$ for designating upper bit priority is in an inactive state ("H" level). Assume that two operand input bits $\overline{D_6}$ and $\overline{D_5}$ are simultaneously activated ("L" level) at this time. In this case, the n-channel MOS transistor N1, as a switch, of the selector $10_5$ is turned off by the operand input bit $\overline{D_5}$ closer to the LSB than the operand input bit $\overline{D_6}$. As a result, lower and upper bit side portions of the carry line 2 are electrically disconnected from each other. Subsequently, the precharge signal $\overline{PR}$ is kept in an active state ("L level") for a short period of time. In addition, the p-channel MOS transistors P1 and P2 for precharge operations are turned on. At this time, a portion, of the carry line 2, on the lower bit side of the n-channel MOS transistor N1 of the selector $10_5$ is kept in a discharge state because the driving power of the n-channel MOS transistor N3 for a discharge operation is set to be larger than that of the p-channel MOS transistor P1 for a precharge operation. A portion, of the carry line 2, on the upper bit side of the n-channel MOS transistor N1 of the selector $10_5$ is precharged to the potential $V_{CC}$ by the p-channel MOS transistor P1 for a precharge operation.

In the selector $10_5$, therefore, two inputs to the second OR gate 5 are set at "L" level. An output from the second OR gate 5 is set at "L" level. Since the enable signal $\overline{SH}$ for designating upper bit priority is input to the first OR gate 4, its output is set at "H" level. An output from the AND gate 6a of the selector $10_5$ is set at "L" level. An output $D_5$ from the NOR gate 6b is set at "H" level in accordance with the logical NOR between the "L"-level output from the AND gate 6a and the "L"-level operand input bit $D_5$.

In contrast to this, in the selectors $10_7$ and $10_6$ on the upper bit side of the selector $10_5$, an output from the second OR gate 5 is set at "H" level in response to an "H"-level input from the carry line 2, an output from the first OR gate 5 is set at "H" level in response to the "H"-level enable signal $\overline{SH}$ for designating upper bit priority, an output from the AND gate 6a is set at "H" level, and an output from the NOR gate 6b is set at "L" level. In the selectors $10_4$ to $10_0$ on the lower bit side of the selector $10_5$, an output from the NOR gate 6b is set at "L" level in response to an "H"-level operand input bit.

In other words, according to the above-described operation, the active operand input bits are searched from the LSB. The output from the selector $10_5$, to which the operand input bit $\overline{D_5}$ searched out first is input, is set at "H" level so as to indicate that the LSB Of the active operand input bits is the bit $\overline{D_5}$. Even if a bit upper than the operand input bit $\overline{D_5}$ is in an active state ("L" level), since it is not the LSB of the active operand input bits, it is regarded as an inactive bit ("H" level).

Figure 8A:
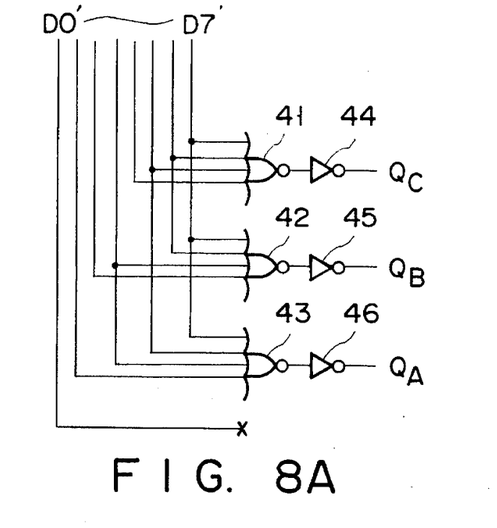
FIGS. 8A to 8C are circuit diagrams each showing a practical example of an encoder stage having no bit priority function in the encoder shown in FIG. 5.
Figure 8B:
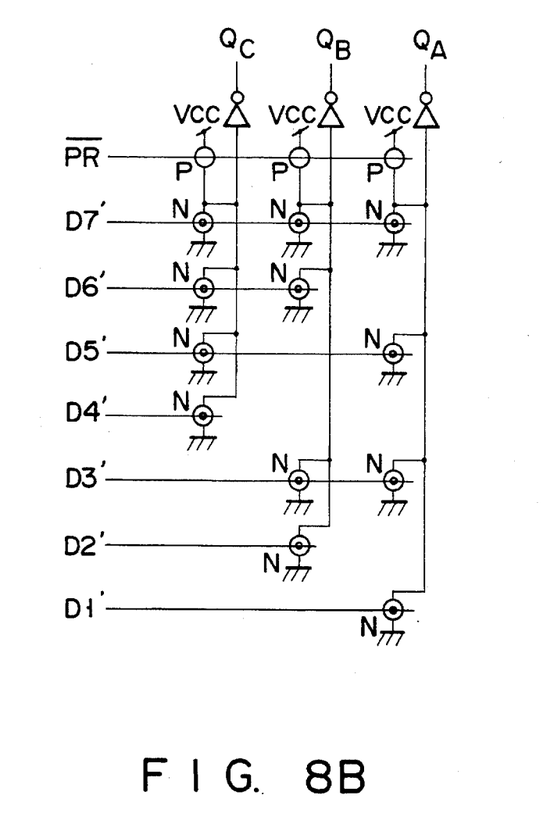
Figure 8C:
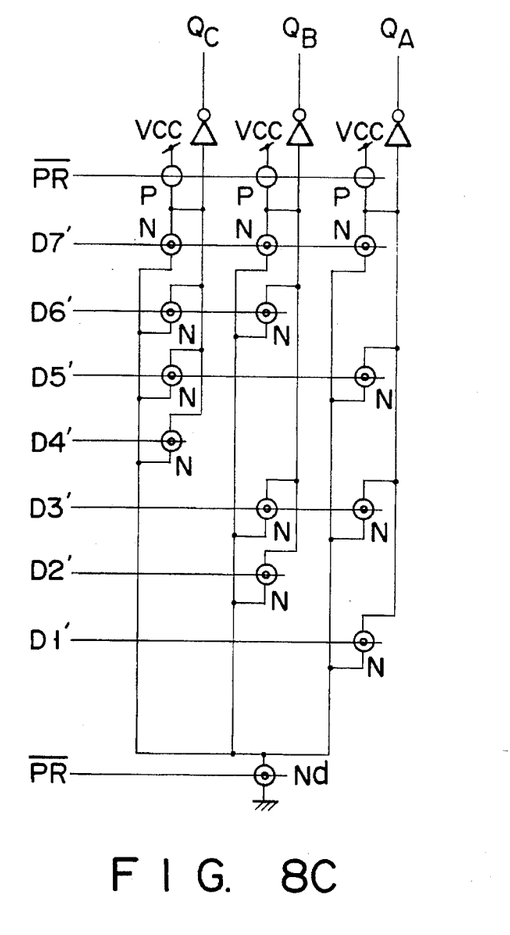

FIGS. 8A, 8B, and 8C show different practical examples of the encoder stage 20 having no bit priority function. FIG. 8A shows an encoder stage having a CMOS static logic arrangement. Referring to FIG. 8A, reference numerals 41 to 43 denote NOR gates; and 44 to 46, inverters. FIG. 8B shows an encoder stage having a dynamic logic arrangement. N-channel MOS transistors N precharged by p-channel MOS transistors are wired OR, and wired-OR outputs are input to inverters 47. FIG. 8C shows another encoder stage having a dynamic logic arrangement. N-channel MOS transistors N precharged by p-channel MOS transistors P are wired OR, and wired-OR outputs are input to inverters 47. The sources of the wired-OR-connected n-channel MOS transistors N are connected to an n-channel MOS transistor Nd for a discharge operation.

In the above embodiment, "L" level of an operand input bit is set to be significant. However, as in another embodiment shown in FIG. 9, either "H" level or "L" level of an operand input bit may be set to be significant by arranging a detection level selecting circuit $51_i$ (i=7 to 0) on the operand bit input side of each selector $10_i$ (i=7 to 0) so as to selectively detect "H" level or "L" level of an operand input bit $\overline{Di}$ (i=7 to 0) and to output it to the selector side. More specifically, the detection level selecting circuit $51_i$ comprises: a first NAND gate 52 for calculating a logical NAND between a detection level select signal LS and the operand input bit $\overline{Di}$; an OR gate 53 for calculating a logical OR between the detection level select signal LS and the operand input bit Di; and a second NAND gate 54 for calculating a logical NAND between outputs from the first NAND gate 52 and the OR gate 53, and outputting it to the selector side.

Figure 9:
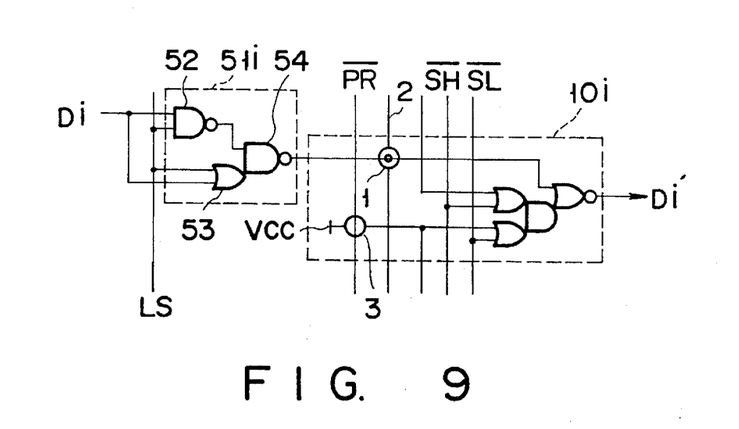
FIG. 9 is a circuit diagram showing a part of another embodiment of the present invention.

When the detection level select signal LS is at "H" level, the detection level selecting circuit $51_i$ detects "L" level of an operand input bit and outputs it to the selector side. When the detection level select signal LS is at "L" level, the circuit $51_i$ detects "H" level of an operand input bit and outputs it to the selector side.

Note that the same reference numerals in FIG. 9 denote the same parts as in the above-described embodiment.

As has been described above, according to the priority encoder of the present invention, since the circuit arrangement is simplified by employing a dynamic circuit arrangement, an excessive increase in hardware can be prevented even if the number of bits of an input signal is increased. In addition, since an increase in occupied area on an IC chip can be suppressed, a high packing density can be achieved. In this case, with a simple circuit arrangement, the upper and lower bit priority schemes can be selectively designated by using enable signals for respectively designating upper bit priority and lower bit priority. Furthermore, since switch elements for searching active bits of an input signal are connected in series with a common carry line, a delay time from the input signal to the encoder stage is shortened. Therefore, a high-speed encoder can be realized. Moreover, since an increase in hardware is substantially proportional to an increase in number of bits of an input signal, a pattern size can be easily estimated in the design of a priority encoder in accordance with the number of bits.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A priority encoder, which detects an active bit (first level) located nearest to a most significant bit (MSB) or nearest to a least significant bit (LSB) among $2^n$ bits of input data and converts the input data into n bits of coded output data, said priority encoder comprising:

a set of selectors, the set having $2^n$ selectors interconnected in order from the MSB to the LSB of input data, each selector including at least one switch circuit receiving a respective bit of input data, having respective terminals A and B, and having a switching element connected between the respective terminals A and B;

the set of $2^n$ selectors having carry line means for connecting the respective terminal A of the included at least one switch circuit of a particular selector into a respective neighboring one of the selectors for a next more significant bit in sequential order to the respective terminal B of the respective at least one switch circuit included in the respective neighboring one selector, for connecting the respective terminal B of the included at least one switch circuit into another respective neighboring selector for a next less significant bit in sequential order to the respective terminal A of the respective at least one switch circuit included in the respective other neighboring selector to provide series connection of the switching elements in at least a subset of the set of $2^n$ selectors; and each selector including a detector section connected serially with the respective terminals A and B of the included switch circuit and receiving the one bit of input data;

the priority encoder further comprising:

an encoder connected to said set of $2^n$ selectors, receiving outputs from said set of $2^n$ selectors, and sending a signal of n bits of coded output data transformed from the outputs from said set of $2^n$ selectors;

control means for receiving the respective bit of input data as an active bit or an inactive bit for the respective selector and for closing the switching element when receiving an inactive bit and for opening the switching element when receiving an active bit, the control means of all of the selectors cooperating with the detector sections of all of the selectors to detect among the open switching elements a particular open switching element distinguished by location with respect to the MSB or the LSBI a first discharge circuit connected between ground potential and terminal A of said switch circuit receiving the MSB of input data and a second discharge circuit connected between ground potential and terminal B of said switch circuit receiving the LSB of input data;

means for controlling the discharge circuits in response to a detection of an open circuit nearest to the MSB or the LSB; and a precharge circuit including at least one p-channel MOS transistor connected between a power supply terminal and the carry line of each respective particular selector, the switching element included in the respective particular selector including an n-channel MOS transistor having a gate for receiving an input data bit and having a source and a drain connected in series with the carry line, the discharge circuits including n-channel MOS transistors connected between ground potential and the respective one of said terminal A of the switch circuit receiving the MSB of input data and said terminal B of the switch circuit receiving the LSB of input data.

2. A priority encoder according to claim 1, comprising:

a precharge circuit including at least a p-channel MOS transistor connected between a power supply terminal and the carry line of each respective particular selector, the switching element included in the respective particular selector including an n-channel MOS transistor having a gate for receiving an input data bit and having a source and a drain connected in series with the carry line.

3. A priority encoder, which detects an active bit (first level) located nearest to a most significant bit (MSB) or nearest to a least significant bit (LSB) among $2^n$ bits of input data and converts the input data into n bits of coded output data, said priority encoder comprising:

a set of selectors, the set having $2^n$ selectors interconnected in order from the MSB to the LSB of input data, each selector including at least one switch circuit responsive to a respective bit of input data, having respective terminals A and B, and having a switching element connected between the respective terminals A and B; the set of $2^n$ selectors having carry line means for connecting the respective terminal A of the included at least one switch circuit of a particular selector into a respective neighboring one of the selectors for a next more significant bit in sequential order to the respective terminal B of the respective at least one switch circuit included in the respective neighboring one selector, for connecting the respective terminal B of the included at least one switch circuit into another respective neighboring selector for a next less significant bit in sequential order to the respective terminal A of the respective at least one switch circuit included in the respective other neighboring selector to provide series connection of the switching elements in at least a subset of the set of $2^n$ selectors;

the priority encoder further comprising:

an encoder connected to said set of $2^n$ selectors, receiving outputs from said set of $2^n$ selectors, and sending a signal of n bits of coded output data transformed from the outputs from said set of $2^n$ selectors;

means for closing each switching element in response to the respective bit of input data received as an inactive bit (second level) and for opening each switching element in response to the respective bit of input data received as an active bit and for detecting among the open switching elements a particular open switching element distinguished by location with respect to the MSB or the LSB;

a first discharge circuit connected between ground potential and terminal A of said switch circuit receiving the MSB of input data and a second discharge circuit connected between ground potential and terminal B of said switch circuit receiving the LSB of input data;

means for controlling the discharge circuits in response to a detection of an open circuit nearest to the MSB or the LSB; and a precharge circuit including at least one p-channel MOS transistor connected between a power supply terminal and the carry line of each respective particular selector, the switching element included in the respective particular selector including an n-channel MOS transistor having a gate for receiving an input data bit and having a source and a drain connected in series with the carry line, the discharge circuits including n-channel transistors connected between ground potential and the respective one of said terminal A of the switch circuit receiving the MSB input data and said terminal B of the switch circuit receiving the LSB of input data.

4. A priority encoder according to claim 3, comprising:

a precharge circuit including at least a p-channel MOS transistor connected between a power supply terminal and the carry line of each respective particular selector, the switching element included in the respective particular selector including an n-channel MOS transistor having a gate for receiving an input data bit and having a source and a drain connected in series with the carry line.

5. A priority encoder, which detects an active bit located nearest to a most significant bit (MSB) or nearest to a least significant bit (LSB) among 2n bits of input data and converts the input data into n bits of coded output data, said priority encoder comprising:

a first discharge circuit, controlled by a first discharge signal, for outputting a first potential;

a second discharge circuit, controlled by a second discharge signal, for outputting the first potential;

2n switch circuits connected in series between the first and second discharge circuits, each of the switch circuits being controlled by a predetermined bit among 2n bits of the input data;

a plurality of precharge circuits for outputting a second potential, the precharge circuits being controlled by a precharge signal, and each connected to connection points between switch circuits, between the first discharge circuit and the 2n switch circuits, and between the second discharge circuit and the 2n switch circuits;

2n detectors each respectively connected to a respective pair of different points in the 2n switch circuits to detect and output an active bit when the two different points have different potentials;

an encoder stage for converting 2n bits of the data output from 2n of the detectors to n bits of coded data.

6. A priority encoder according to claim 5, wherein $2^n$ of the switch circuits constitute a carry line.

7. A priority encoder according to claim 5, wherein the first discharge circuit outputs the first potential in an upper bit priority mode such that a detector connected to the both ends of a switch circuit controlled by an active bit located nearest to the MSB among $2^n$ bits of the input data outputting an active bit, and the second discharge circuit outputs the first potential in a lower bit priority mode such that a detector connected to both ends of switch circuit controlled by an active bit located nearest to the LSB among $2^n$ bits of the input data outputting an active bit.

8. A priority encoder according to claim 5, wherein each of the switch circuits is constituted by a MOS transistor.

9. A priority encoder according to claim 5, wherein the first and second discharge circuits are constituted by a MOS transistor.

10. A priority encoder according to claim 5, wherein each of the precharge circuits is constituted by a MOS transistor.

* * * * *

UNITED STATES PATENT AND TRADEMARK OFFICE
CERTIFICATE OF CORRECTION

PATENT NO. : 5,511,222      Page 1 of 2
DATED : April 23, 1996
INVENTOR(S) : Masue SHIBA et al.

It is certified that error appears in the above-indentified patent and that said Letters Patent is hereby corrected as shown below:

In the Abstract, Line 1, "encoder-includes" should read --encoder includes--;

Claim 1, Column 8, Line 7, after "inactive bit", insert --(second level)--;

Claim 1, Column 8, Line 15, "LSBI" should read --LSB;--;

Claim 3, Column 9, Line 34, after "n-channel"", insert --MOS--;

UNITED STATES PATENT AND TRADEMARK OFFICE
CERTIFICATE OF CORRECTION

PATENT NO. : 5,511,222
DATED : April 23, 1996
INVENTOR(S) : Masue SHIBA et al

It is certified that error appears in the above-indentified patent and that said Letters Patent is hereby corrected as shown below:

Claim 3, Column 9, Line 36, after "MSB", insert -- of --.

Signed and Sealed this

Seventh Day of January, 1997

Attest:

BRUCE LEHMAN

*Attesting Officer*    *Commissioner of Patents and Trademarks*